United States Patent
Minne et al.

[11] Patent Number: 6,028,305
[45] Date of Patent: Feb. 22, 2000

[54] DUAL CANTILEVER SCANNING PROBE MICROSCOPE

[75] Inventors: Stephen C. Minne, Danville, Ill.; Calvin F. Quate, Stanford, Calif.

[73] Assignee: Board of Trustees of the Leland Stanford Jr. University, Stanford, Calif.

[21] Appl. No.: 09/047,239

[22] Filed: Mar. 25, 1998

[51] Int. Cl.[7] .................................................. H01J 3/14
[52] U.S. Cl. ..................... 250/234; 250/559.22; 250/306
[58] Field of Search ........................... 250/234, 559.22, 250/306, 201.3; 356/376, 377

[56] References Cited

U.S. PATENT DOCUMENTS

| | | | |
|---|---|---|---|
| 5,308,974 | 5/1994 | Elings et al. | 250/234 |
| 5,742,377 | 4/1998 | Minne et al. | 355/71 |
| 5,883,705 | 3/1999 | Minne et al. | 250/234 |

OTHER PUBLICATIONS

G. Binnig et al. "Review of Scientific Instruments", vol. 57, pp. 1688–1689, Aug. 1986.

*Primary Examiner*—Que T. Le
*Attorney, Agent, or Firm*—Skjvern Morrill, MacPherson, Franklin & Friel LLP; David E. Steuber

[57] ABSTRACT

This microscope apparatus comprises two probes. The first probe is configured to interact with and measure characteristics of surfaces within an effective measurement distance of the first probe. This probe could be contact type, non-contact type, constant force mode, or constant height mode. A combination of actuation devices positions the first probe over a surface of a sample. The surface is scanned at high speeds in search of a target area. When a target area is found, a scanner moves the sample so that a second contact type probe with a sharp tip is positioned over the target area. The second probe is activated and the target area is scanned at low speeds and high resolution. The first and second probes are part of the same probe assembly. The probe assembly of the present invention does not require probe replacement as frequently as current assemblies because the sharp tip is used only at low speeds and high resolution configurations. Thus, the sharp tip wears slower than it would if the sharp tip was used to find the target feature as well.

20 Claims, 5 Drawing Sheets

DUAL CANTILEVER SCANNING PROBE MICROSCOPE

This invention was made with Government support under contract NSF-ECS-952219555 awarded by the National Science Foundation. The Government has certain rights in this invention.

FIELD OF THE INVENTION

The present invention relates to scanning probe microscopes. More specifically, it pertains to high speed scanning probe microscopy using a scanning probe microscope containing a plurality of probe cantilevers.

BACKGROUND OF THE INVENTION

Scanning probe microscopes (hereinafter, "SPM's") are instruments which provide a microscopic analysis of the topographical features or other characteristics of a sample surface by causing a probe to scan the sample surface, typically in a raster pattern.

One type of SPM is a "contact-type" SPM in which the probe consists of a cantilever with a sharp tip located near its free end. The other end of the cantilever is coupled to the body of the SPM. As the cantilever is scanned, the tip moves relative to and interacts with the sample surface. A change in the tip elevation due to interaction with height deviations on the sample surface causes the deflection of the cantilever to change. The tip elevation is detected and plotted on a graphical user interface device such as a computer monitor.

There are several ways of determining the change in tip elevation. One is by first determining the degree of deflection variance of the cantilever. This degree of deflection variance can be determined by pointing a laser beam towards a reflector positioned on the cantilever. An image detector receives the reflected laser beam. As the deflection of the cantilever changes, the angle of incidence between the unreflected laser beam and the reflector on the cantilever will change. Thus, the change in deflection of the cantilever will cause the reflected laser beam to radiate on a portion of the image detector that is different than the portion of the image detector that would have received the laser beam without the change in deflection of the cantilever. The output of the image detector is used to determine the deflection of the cantilever because the geometries and materials (and thus deflection characteristics) of each portion of the cantilever is known. From this data, the change in tip elevation is determined and plotted on a graphical user interface for convenient user viewing.

In constant force scanning, as the tip elevation changes are detected, the end of the cantilever coupled to the body of the microscope is moved relative to the sample surface such that the cantilever has a constant deflection. The movement means is coupled in a feedback system such that the cantilever moves substantially simultaneously with the vertical elevation change of the tip. The end result is that the cantilever never has significant deflection variances. Once a minor deflection change is detected, the cantilever moves in response to counteract the deflection change. Therefore, the tip applies a constant force on the sample surface.

At the atomic scale, an effective actuator for causing such small movements is the piezoelectric tube. The rigid end of the cantilever and/or the sample surface is attached to a piezoelectric tube. The piezoelectric tube(s) respond to a signal by expanding or contracting. This feedback process occurs continuously such that the tip exerts a constant force on the sample surface. A more detailed discussion on contact mode SPM's may be found in U.S. Pat. No. 5,376,790 (Linker et al.) issued Dec. 27, 1994 entitled "Scanning Probe Microscope" which is incorporated herein by reference in its entirety.

An atomic force microscope (hereinafter, "AFM") is a type of SPM which is capable of detecting topographical features often down to the atomic scale. It is well known that the more detailed the resolution requirements, the sharper the tip of the probe must be. As the tip travels along and in contact with the surface, the tip will inevitably wear. AFM and other fine resolution SPM's are particularly sensitive to tip wear because the AFM's require atomic levels of resolution. Tip wear degrades the resolution ability of the probe. Therefore, the tip must be replaced often, especially in AFM's. Currently, tips are so small and delicate that it is the entire probe assembly that is replaced after the tip has worn so much that desired resolutions can no longer be obtained. Thus, it is the entire probe assembly which must be replaced often.

Wearing of the tip is inevitable in contact type SPM's. A tip can only cover a finite distance before becoming worn so much that desired resolution cannot be attained. In AFM's, this finite distance is relatively small because the desired resolution is so detailed. Currently, a contact mode SPM tip will last approximately a few hours before reaching this finite distance. However, as finer details are required in response to the rapid down-scaling of feature dimensions on integrated circuits, the finite distance will decrease. Furthermore, technology is enabling faster scanning speeds. One such technology is disclosed in pending U.S. application Ser. No. 08/558,563, (Minne et al.), now U.S. Pat. No. 5,883,705, which is incorporated herein by reference in its entirety. As higher speed scanning is developed, the finite distance that wears the tip to intolerable levels will be reached more rapidly, thereby decreasing the lifetime of the tip. As changing of the cantilever becomes more frequent, operators have a motivation to settle for more degraded resolution requirements, thereby compromising the resolution of the scanning. This compromise is unnecessary in light of the principles of the present invention.

Furthermore, a cantilever capable of high speed imaging is much more complex and expensive than a regular cantilever. Thus, as scanning is performed at higher speeds, the user will have to replace more expensive cantilevers even more often. This is expensive and provides another motivation for the user to settle for degraded resolution. Therefore, what is desired is an SPM which has probes capable of traveling larger distances in contact with sample surfaces before requiring probe replacement without sacrificing resolution.

SUMMARY OF THE INVENTION

An apparatus comprises two probes. The first probe is configured to interact with and measure characteristics of surfaces within an effective measurement distance of the first probe. A first mechanism is configured to position the first probe over a surface of a sample at a first point, the point being within the effective measurement distance of the first probe. A second mechanism is configured to contact and remove the second probe to and from the sample surface at a second point. The second point is separated from the first point by a predetermined distance in a predetermined direction. A third mechanism is configured to move the second probe the predetermined distance in the predetermined direction thereby moving the second probe to contact the first point. In one embodiment, the apparatus is a microscope having a microscope body and the probes are contact type probes. Each contact probe has a tip, one being sharper than the other. Therefore, the above apparatus enables a dual contact type probe assembly which can efficiently transition between a sharp tip for high resolution applications and a dull tip for high speed applications.

A method for probing a surface of a sample comprises contacting the first probe to the sample. Then, the first probe is moved along the surface of the sample until the contact end contacts a target point on the surface. Next, the second probe contacts the target point and performs the analysis of a region of the sample near the target point.

DESCRIPTION OF THE INVENTION

Figure 1:
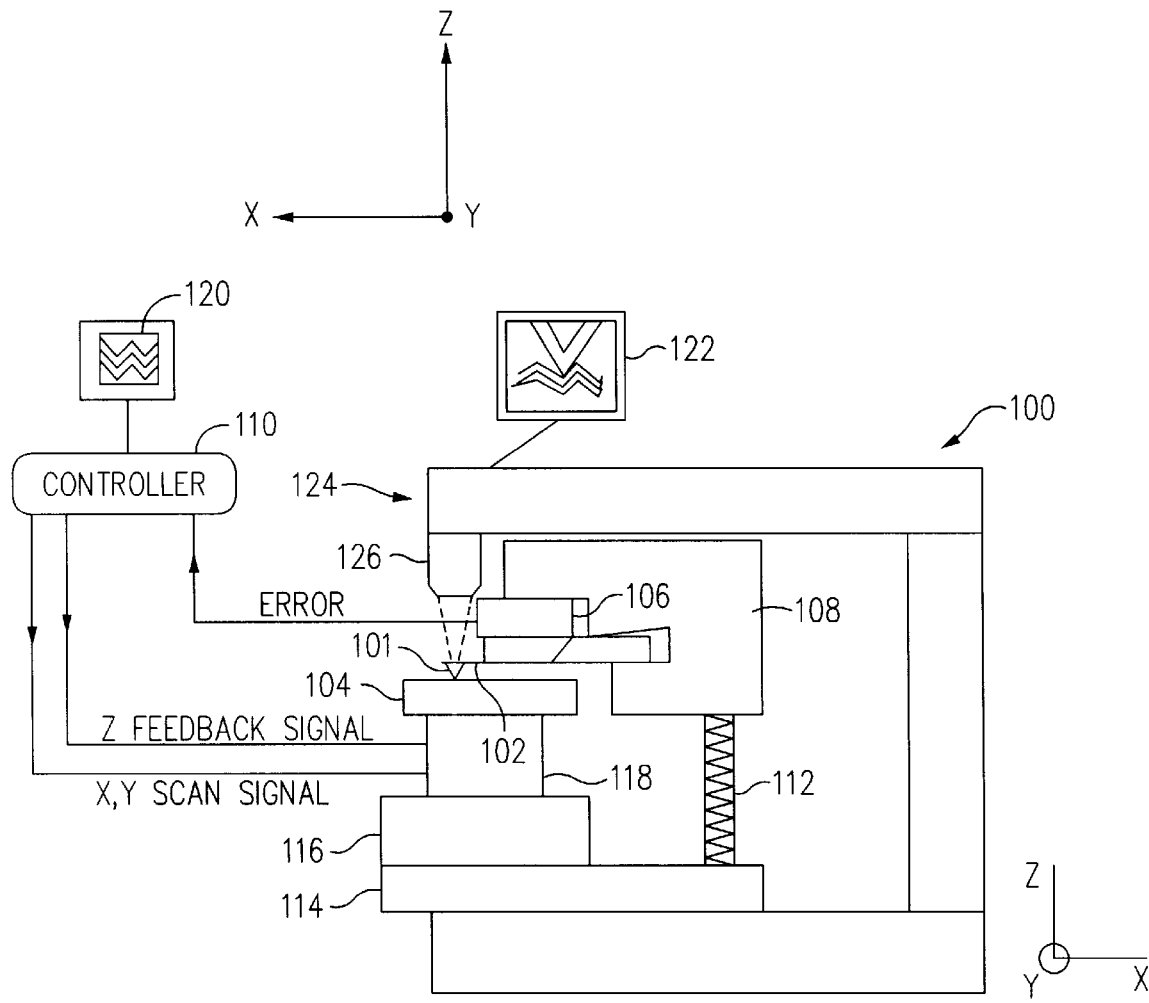
FIG. 1 illustrates a general schematic view of a microscope according to one embodiment of the invention.

FIG. 1 illustrates a general schematic view of a microscope 100 according to one embodiment of the invention. Microscope 100 includes a probe assembly 102, a sample 104, a deflection sensor 106, a head 108, a controller 110, a z coarse stage 112, a base 114, an x, y coarse stage 116, a scanner 118, a graphical viewing monitor 120, and optical viewing assembly 124 for viewing optical image 122 and having an objective lens 126.

Figure 2:
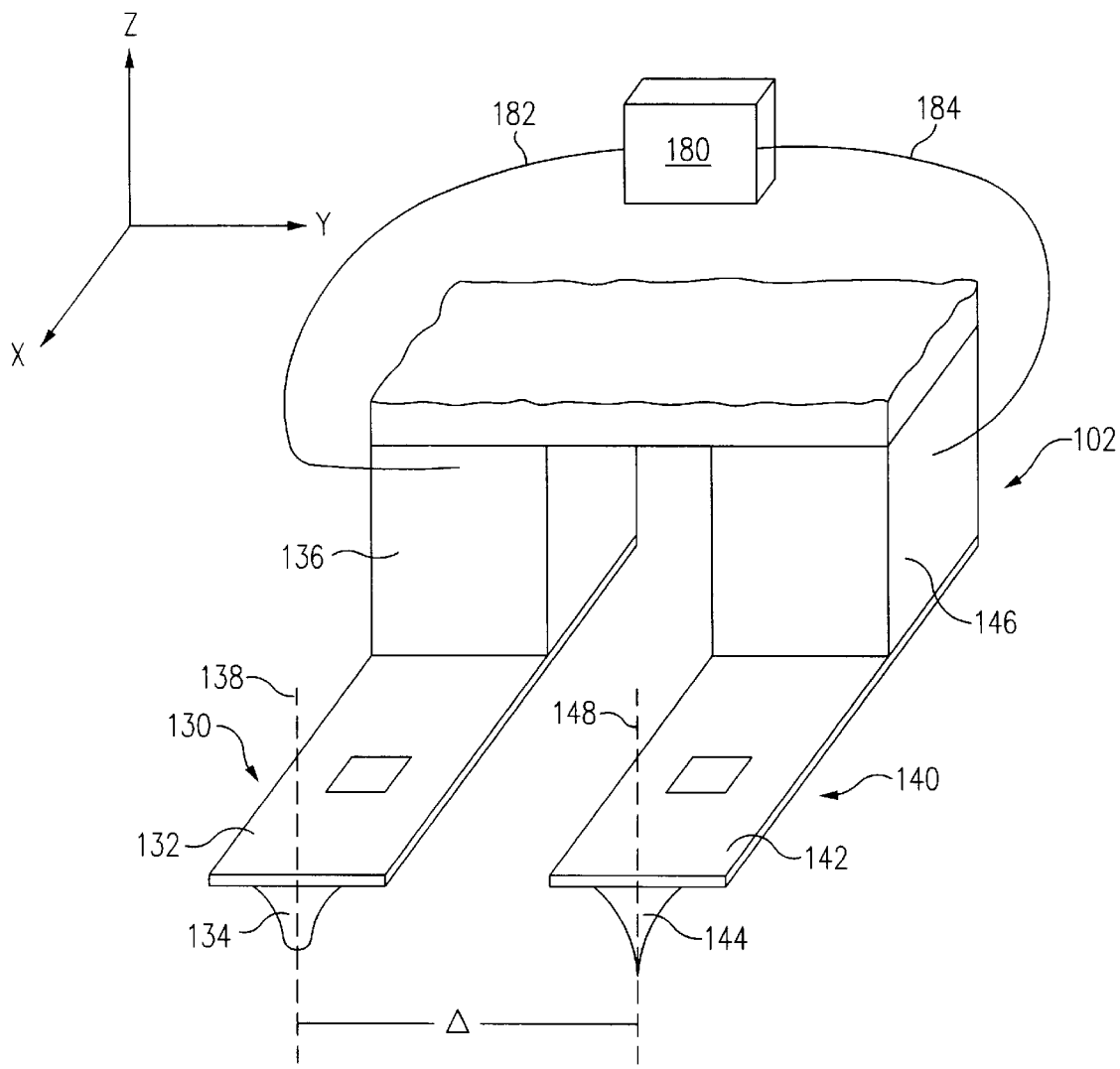
FIG. 2 illustrates a detailed perspective view of the probe assembly of FIG. 1.

FIG. 2 illustrates a detailed perspective view of the probe assembly 102 of FIG. 1. Probe assembly 102 includes a dull probe 130 and a sharp probe 140. Dull probe 130 includes a first cantilever 132, a dull tip 134, and a first actuator 136. Sharp probe 140 includes a second cantilever 142, a sharp tip 144, and a second actuator 146. Probe assembly also comprises a cantilever controller 180 coupled to dull probe 130 and sharp probe 140 with connection lines (182 and 184, respectively).

Cantilever controller 180 is configured such that at least one of either dull probe 130 or sharp probe 140 is "active". "Active" is defined as having a tip within an effective measurement distance of a surface of sample 104. "Effective measurement distance" is defined as the maximum distance between the measuring device and the sample that will allow the measuring device to measure characteristics of the sample. In one embodiment shown in FIGS. 2–8, the effective measurement distance is zero because the probes (130 and 140) are contact type probes. In another embodiment, probe 130 is a non-contact probe with the effective measurement distance being non-zero as represented by the effective measurement distance 190 shown in FIG. 3. In one embodiment, only one of either dull probe 130 or sharp probe 140 is "active".

Referring again to FIG. 1, probe assembly 102 approaches sample 104 by means of z coarse stage 112, which links head 108 to base 114. X, y coarse stage 116 is situated on base 114 and positions sample 104 in the x and y directions (hereinafter, "horizontally") at the proper general position below probe assembly 102. Scanner 118 is mounted on x, y coarse stage 116 and supports sample 104.

X, y coarse stage 116 operates to move sample 104 over relatively large ranges horizontally of, for example, 25 mm. Z coarse stage 112 operates to move sample 104 over relatively large ranges in the z-direction (hereinafter, "vertically") of, for example, 25 mm. Scanner 118 operates to move sample 104 over relatively small ranges. Scanner 118 has horizontal and vertical translation ranges of, for example, 100 $\mu$m and 10 $\mu$m, respectively. Scanners or actuators for moving object over small distances are well known in the art. One example is a piezoelectric tube scanner which is described in an article by G. Binnig et al., *Review of Scientific Instruments*, v. 57, p. 1688 (August 1986), which is incorporated herein by reference in its entirety. A description of piezoelectric elements being used in a cantilever assembly is contained in U.S. patent application Ser. No. 08/519,108, filed Aug. 25, 1995, entitled "Cantilever For Scanning Probe Microscope Including Piezoelectric Element And Method Of Using The Same", now U.S. Pat. No. 5,742,377, which is incorporated herein by reference in its entirety.

Deflection sensor 106, located in head 108, detects the deflection of the cantilever (132 or 142) of the active probe (130 or 140) as the probe (130 or 140) scans the surface of sample 104. Deflection sensor 106 then sends a signal to controller 110 representative of the measured deflection (hereinafter, "error signal"). Controller 110 generates an x, y scan signal which actuates scanner 118 or x, y coarse stage 116 or both, depending on the scale of movement, to move sample 104 in a specified scanning pattern under probe assembly 102. In one embodiment and in constant force scanning, controller 110 also uses the error signal provided by deflection sensor 106 to generate a z feedback signal. The z feedback signal causes scanner 118 to alter the vertical position of sample 104 and/or the respective actuator (136 or 146) of the active probe (130 or 140) so as to maintain a constant deflection of the cantilever (132 or 142) of the active probe (130 or 140).

The z feedback signal is also the output of microscope 100 and may be used to generate a graphical image of the surface of sample 104 on graphical viewing monitor 120. Alternatively, the image may be generated using the error signal from deflection sensor 106.

Optical image 122 of both probe assembly 102 and a portion of sample 104 is provided by optical viewing assembly 124, which includes objective lens 126. Optical viewing assembly 124 provides combined coaxial and oblique angle magnified views of probe assembly 102 and sample 104.

Referring again to FIG. 2, the upper end of each of first and second cantilevers (132 and 142) are rigidly coupled to first and second actuators (136 and 146), respectively. First and second cantilevers (132 and 142) also include dull and sharp tips (134 and 144), respectively, disposed downward from the lower end of first and second cantilevers (132 and 142), respectively.

First and second actuators (136 and 146) are mechanisms designed to move dull tip 134 and sharp tip 144 vertically within a range. The vertical range of the first actuator 136 has a lower limit which enables the dull tip 134 to contact the surface of sample 104. In one embodiment, the upper limit of the range is such that dull tip 134 does not contact sample 104. This ensures that dull tip 134 does not contact sample 104 as sample 104 is moved relative to dull tip 134 horizontally when dull tip 134 is not active.

In this embodiment, second actuator 146 has a lower limit such that actuator 146 causes sharp tip 144 to contact the surface of sample 104. Furthermore, actuator 146 has an upper limit which allows sharp tip 144 to be separated from sample 104. This insures that sharp tip 144 does not contact sample 104 as sample 104 is moved relative to sharp tip 144 horizontally when sharp probe 144 is not active.

Note that dull tip 134 and sharp tip 144 have actuation paths (138 and 148), respectively, shown in FIGS. 3–8 as dashed lines. "Actuation path" is defined as the movement range of the tip of a probe when an actuator of the probe moves within its range of movement and the tip is not resisted by a sample surface.

The point where actuation path 138 intersects the sample 104 upper surface when sample 104 is properly position for measurement and the point where actuation path 148 intersects the sample 104 surface are separated by a distance Δ (see FIGS. 2–7). The value of distance Δ is not critical. In the preferred embodiment, this value, whatever it is, is known. A typical distance Δ would be 100 μm, but it could be much smaller or larger.

The following description describes the operation of the principles of the present invention in "high speed configuration" and "high resolution configuration" with reference to FIGS. 3–6. Although not detailed for each figure, it will be apparent that each sample 104 shown in FIGS. 3–6 is brought into rough proximity of the dull and sharp tips (134 and 144) by means of appropriate combinations of x, y course stage 116, z coarse stage 112. Furthermore, sample 104 is brought into more precise proximity by means of scanner 118, if such precision is needed.

Figure 3:
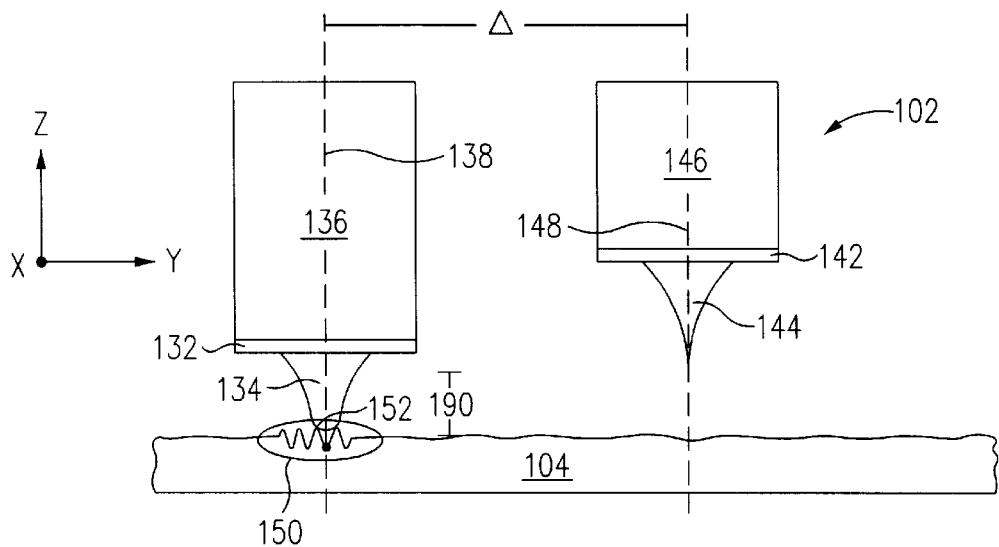
FIG. 3 illustrates the a side view along the x axis of the probe assembly in a high speed configuration.

FIG. 3 illustrates a side view along the x axis of probe assembly 102 in a high speed configuration. In high speed configuration, dull tip 134 is in contact with sample 104 as sample 104 moves horizontally. Dull tip 134 is lowered when first actuator 136 is activated. Sharp tip 144 is not in contact with sample 104 in high speed configuration and thus does not wear during high speed configuration.

Note that dull tip 134 will not provide as much detail as sharp tip 144 would because dull tip 134 will not be able to detect variations in topography below a given resolution. For example, referring to FIG. 3, dull tip 134 is too dull to enter the valleys within feature 150 of sample 104. Therefore, these valleys cannot be detected by dull tip 134 deflecting.

High speed configuration is used when dull tip 134 needs to pass quickly over and in contact with sample 104 but also when only a relatively large scale resolution is required. For example, to find a larger scale feature on sample 104 quickly, high speed configuration would be appropriate. Dull tip 134 can pass relatively quickly over sample 104 using x, y coarse stage 116 to move sample 104 horizontally. Scanner 118 may be used for such a purpose if the scanner has ability to move sample 104 at the desired relatively quick speed. Alternatively, similar mechanisms for movement (not shown) are coupled to probe assembly 102 to move probe assembly 102 instead of sample 104. Also, both probe assembly 102 and sample 104 can be moved according to the above means to provide the desired relative movement.

Of course, dull tip 134 will wear slightly during operation in high speed configuration. However, since dull tip 134 was dull to start out with, there will be very little loss in resolution due to a unit increment of wear. A "unit increment of wear" is defined as a loss of a unit of mass of the tip. Furthermore, since there is high tolerance for relatively large scale resolution during high speed configuration, dull tip 134 will be able to travel a relatively long distance before dull tip 134 would need replacing. Typically, the wear in the dull tip 134 is not the limiting factor in the lifetime of the probe assembly 102 implementing the principles of the present invention.

During operation, referring again to FIG. 3, sample 104 will be scanned horizontally relative to probe assembly 102 as described above. During this scanning, dull tip 134 rides over the surface of sample 104. Typically, this scanning will continue until the operator sees a desired feature 150 to be examined in optical viewing assembly 124 or in the graphical viewing monitor 120. The operator then instructs the scanning to stop through a user interface panel (not shown). Alternatively, a processor (not shown) is programmed to recognize feature 150 when dull tip 134 encounters feature 150 and signals scanner 118 or x, y coarse stage 116 to stop without operator intervention. Either way, dull tip 134 stops over feature 150 over, for example, point 152. At this time, if a detailed scanning of feature 150 is desired, microscope 100 enters high resolution configuration.

Figure 4:
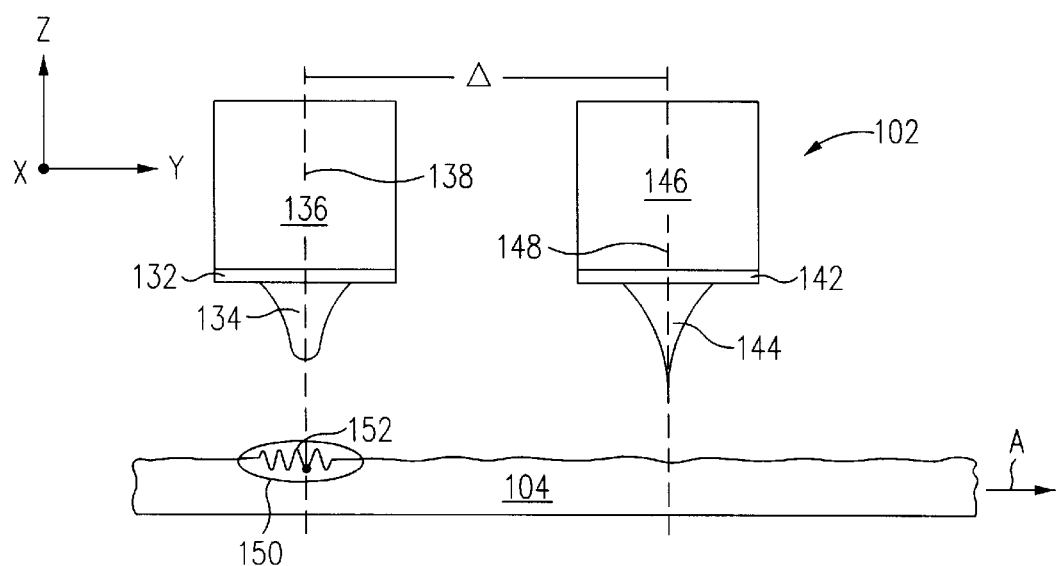
FIG. 4 illustrates a side view along the x axis of the probe assembly in a first transition step for transitioning from high speed configuration to high resolution configuration.
Figure 5:
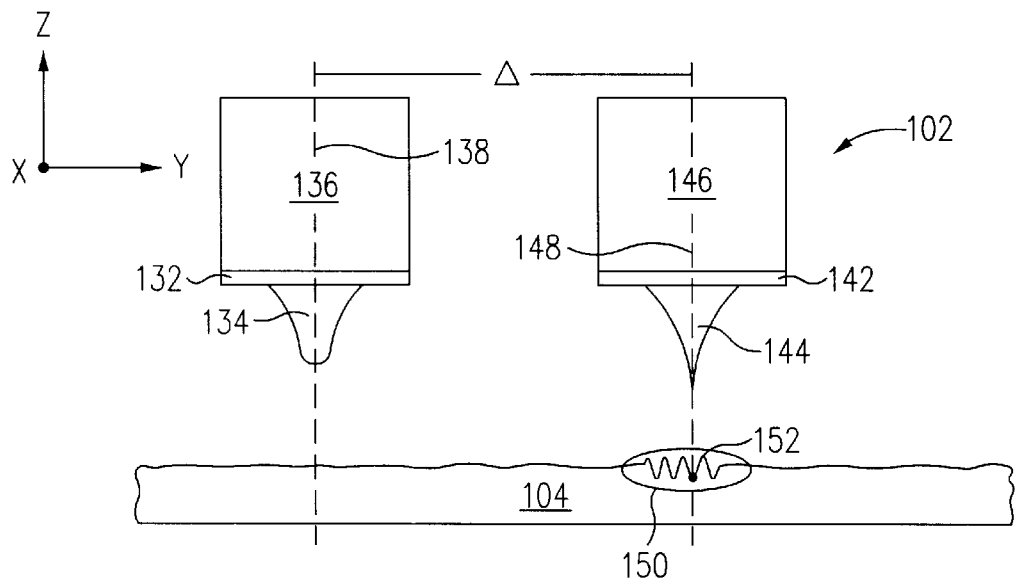
FIG. 5 illustrates a side view along the x axis of the probe assembly in a second transition step for transitioning from high speed resolution to low speed resolution.
Figure 6:
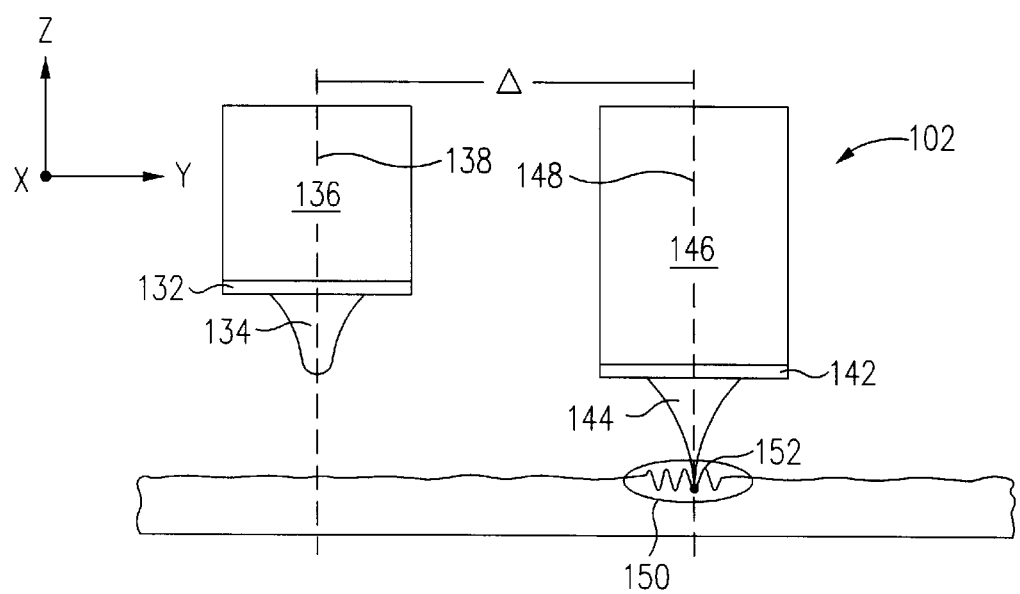
FIG. 6 illustrates a side view along the x axis of the probe assembly in a final transition step for transitioning from high speed configuration to low speed configuration.

FIGS. 4–6 illustrates the steps microscope 100 takes to transition from high speed configuration to high resolution configuration. Specifically, FIG. 4 illustrates a side view along the x axis of probe assembly 102 in a first transition step for transitioning from high speed configuration to high resolution configuration. After it has been determined that feature 150 has been detected, actuator 136 is deactivated causing first cantilever 132 to rise which causes dull tip 134 to rise vertically off of point 152 along its actuation path 138.

FIG. 5 illustrates a side view along the x axis of probe assembly 102 in a second transition step for transitioning from high speed resolution to low speed resolution. After dull tip 134 has risen off of sample 104, sample 104 is scanned horizontally a distance Δ in the direction of the arrow A of FIG. 4. This causes actuator path 148 of sharp probe 140 to intersect with point 152.

FIG. 6 illustrates a side view along the x axis of probe assembly 102 in a final transition step for transitioning from high speed configuration to low speed configuration. After sample 104 is moved such that actuation path 148 intersects with point 152, actuator 146 is activated. This lowers sharp tip 144 along actuation path 148 until sharp tip 144 contacts point 152. High resolution configuration has thus been accomplished. Feature 150 can now be mapped at a high level of resolution by moving sharp tip 144 along the surface of feature 150 in, for example, a raster pattern.

High resolution configuration is used when a relatively high level of detail is desired. Sharp tip 144 will provide more detail than dull tip 134 would. However, sharp tip 144 will wear faster over a given distance than would dull tip 134. Furthermore, wear in sharp tip 144 will cause more of a loss in resolution than the same wear in dull tip 134. Therefore, high resolution configuration is used when traversing a smaller area of sample 104 to obtain a relatively high level of detail compared with high speed configuration. Of course, sharp tip 144 will wear during high resolution configuration. However, sharp tip 144 will have traversed much less distance than it would if sharp tip was used to locate feature 150. Therefore, sharp tip 144 will need replacing much less often allowing for less frequent replacement of the probe assembly 102.

It will be apparent from this disclosure that microscope 100 can also transition from high resolution configuration to high speed configuration. Thus microscope 100 has the capacity to readily alternate between these two configurations as needed. Therefore, what is provided is an apparatus and method for transitioning between high speed configuration and a high resolution configuration in a microscope 100.

The above microscope 100 has been described with reference to two actuators 136 and 146 which allow dull tip 134 or sharp tip 144 to apply a constant force along sample 104 as it interacts with the surface of sample 104. This constant force reduces the rate of wear per unit distance because stresses within the tips (134 and 144) remain relatively constant reducing fatigue and fractures within the tips (134 and 144).

However, the wearing of sharp tip 144 is typically the limiting factor in the lifetime of probe assembly 102. The wearing of dull tip 134 is not nearly as critical. Therefore, depending on the application, it is not necessary that dull tip 134 ride with constant force along sample 104. Some designs may allow the dull tip to ride at "constant height mode" which causes more wear of the tip.

In "constant height mode", the deflection of the cantilever is not continuously eliminated by actuators in the feedback system described above. Instead, the rigid portion of the cantilever is literally rigid and the cantilever is allowed to deflect. Thus no actuator is needed. Therefore, in one embodiment of the invention, actuator 136 is replace with a simple rigid body (not shown) rigidly coupled to the body of microscope 100. Furthermore, dull tip 134 is allowed to ride along the surface of sample 104 even during high resolution configuration, though it will be the deflection of sharp tip 144 that will be measured in high resolution mode. This embodiment is cheaper because it does not require an actuator 136.

The tips (134 and 144) may move relative to sample 104 by either moving the tips or moving sample 104. Therefore, when this disclosure refers to actuating a tip (134 or 144) to sample 104, it will be understood that this actuation can equivalently occur by raising sample 104 towards tip (134 or 144) as well.

Figure 7:
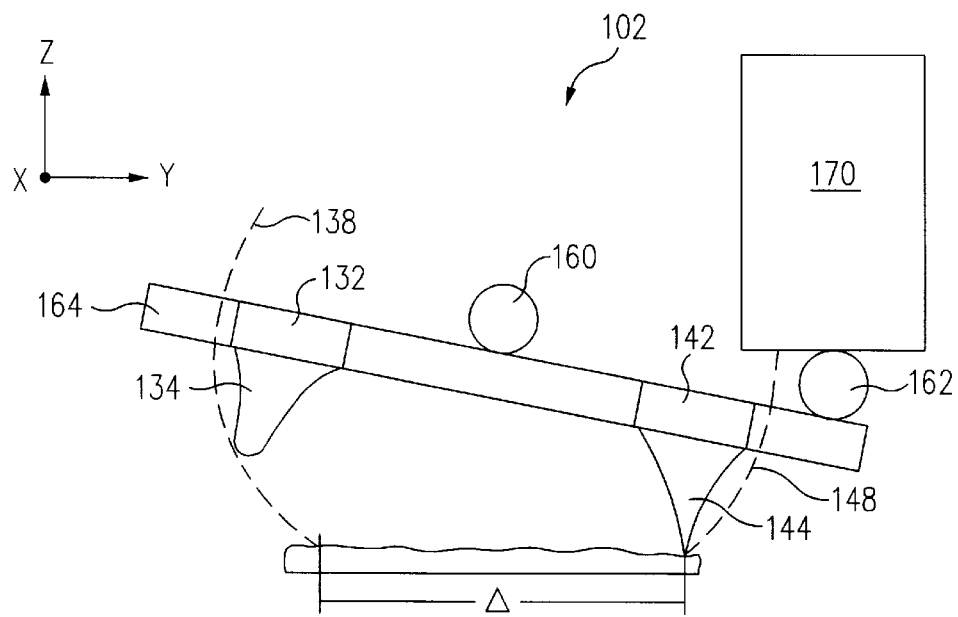
FIG. 7 illustrates a side view along the x axis of a first alternative embodiment of the probe assembly.

FIG. 7 illustrates a side view along the x axis of an alternative embodiment of probe assembly 102. Probe assembly 102 comprises a pivot hinge 160, an actuator hinge 162, a dual cantilever base 164, a first cantilever 132, a second cantilever 142, an actuator 170, a dull tip 134, and a sharp tip 144.

The approximate center of the top surface of dual cantilever base 164 is pivotably coupled to pivot hinge 160. Pivot hinge 160 is coupled to a rigid body (not shown) on microscope 100. The upper surface of one end of dual cantilever base 164 is rotatably coupled to actuator hinge 162. Actuator hinge 162 is coupled to the bottom of actuator 170. A fixed end of each of the first and second cantilevers 132 and 142 are rigidly attached to dual cantilever base 164 while the dull and sharp tips 134 and 144 are disposed on the bottom surface of the free end of respective first and second cantilevers 132 and 142.

The operation of probe assembly 102 is similar to the operations described above. However, when actuator 170 is lowered, sharp tip 144 lowers at the same time as dull tip 134 rises, and vice versa. Dual cantilever base 164 is reversibly locked into place when sharp tip 144 contacts sample 104.

Thereafter, the sharp tip 144 is moved relative to the sample 104 and deflection of second cantilever 142 is detected as described above. When actuator 170 is raised, sharp tip 144 rises as dull tip 134 lowers to contact sample 104 allowing deflection of first cantilever 132 to be measured as described above.

Figure 8:
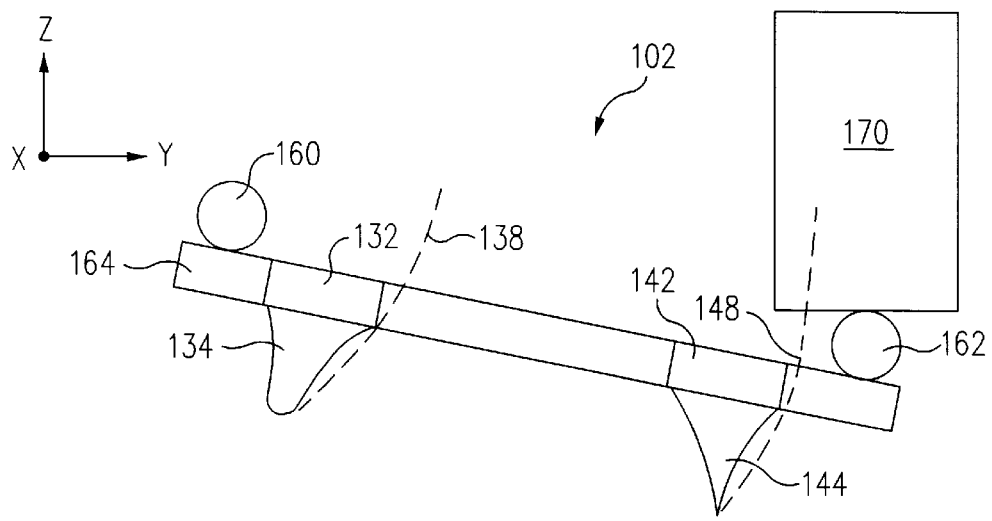
FIG. 8 illustrates a side view along the x axis of a second alternative embodiment of the probe assembly.

FIG. 8 illustrates a side view along the x axis of an alternative embodiment of probe assembly 102. Probe assembly 102 of FIG. 8 is structurally similar to probe assembly 102 of FIG. 7 except that pivot hinge 160 is pivotably coupled to the upper surface of the end of cantilever 164 that is opposite actuator 170. It will be apparent after reviewing this disclosure that pivot hinge 160 may be coupled to a variety of positions on the upper surface of cantilever 164, not just the positions shown in FIGS. 7–8. Furthermore, the hinge could also be coupled to the bottom of cantilever 170.

In the embodiment of FIG. 8, sample 104 must be raise and lowered during the transition. For example, in the transition to high speed configuration, sample 104 must rise as actuator 170 rises in order for dull tip 134 to contact sample 104 surface.

Microscope 100 has been described above as though the steps in the transition procedure occur sequentially. However, in one embodiment, the steps occur simultaneously. For example, dull tip 134 begins to rise off point 152 as sample 104 is beginning to scan the distance Δ and as sharp tip begins to approach sample 104 such that the transition occurs in one smooth motion.

The invention is described above with reference to a microscope 100. Microscope 100 can be any contact mode microscope such as an atomic force microscope. Furthermore, despite the name, dull tip 134 need not be duller than sharp tip 144. For example, in one embodiment, dull tip 134 is sharper than sharp tip 144. It will be apparent from this disclosure that in this embodiment, the sharper dull tip 134 will become duller than sharp tip 144 within a relatively short time of operation. In another embodiment, dull tip 134 has a contact surface with sample 104 that is ten times larger than a contact surface of sharp tip 144 with sample 104. In fact, dull tip 134 could be a sensing portion of a non-contact type probe such as a tunneling sensor of a tunneling probe. Furthermore, sharp tip 144 need not be for measuring topography but can be for measuring other characteristics of sample 104 where contact is necessary.

Furthermore, after reviewing this disclosure, it will be apparent that the principles of the present invention can be applied to a microscope in which the two tips (134 and 144) measure different characteristics. For example, dull tip 134 measures topography and sharp tip 144 measures electrical characteristics.

It will be apparent from this disclosure that the principles of the present invention can be applied to a microscope containing non-contact mode probes in which dull tip 134 is configured to measure characteristic of a surface without actually contacting the surface. Non-contact mode tips are able to measure the characteristic of a sample as long as the tips are within the effective measurement distance.

The above microscope has been described with reference to probe assembly 102 having two tips (134 and 144) which alternatively are active. However, in light of this disclosure, it will be apparent that microscope 100 may accommodate a probe assembly with more than two probes.

The above disclosure is illustrating and not limiting. Further modifications will be apparent to one of ordinary skill in the art in light of this disclosure and the appended claims.

We claim:

1. A scanning probe microscope comprising:
   a first probe configured to interact with and measure characteristics of surfaces within an effective measurement distance of said first probe;
   a first mechanism configured to position said first probe over a first point of a surface of a sample within said effective measurement distance;
   a second probe;
   a second mechanism configured to contact and remove said second probe to and from said surface of said sample at a second point, wherein said second point is separated from said first point by a predetermined distance in a predetermined direction; and
   a third mechanism configured to move said second probe said predetermined distance in said predetermined direction.

2. The scanning probe microscope of claim 1, wherein said third mechanism comprises:
   a scanner configured to receive, interpret, and respond to data representing movement instructions, said movement instructions instructing said scanner to move said sample said predetermined distance in said first direction; and
   a controller configured to send said data to said scanner.

3. The scanning probe microscope of claim 2, wherein said scanner comprises piezoelectric tubes.

4. The scanning probe microscope of claim 1, wherein said first probe is a contact type probe which is configured to interact with and measure said characteristics of said surfaces by contacting said surface, whereby said effective measurement distance is zero.

5. The scanning probe microscope of claim 4, further comprising a microscope body, wherein said first mechanism is a first actuator having a first and second end, said first actuator coupled to said microscope body at said first end of said first actuator and coupled to said first probe at said second end of said first actuator.

6. The scanning probe microscope of claim 5, wherein said first probe comprises a first contact type probe, said contact type probe comprising a first tip, said effective measurement distance being zero in that said first contact type probe cannot measure characteristics of said surface of said sample without actually contacting said surface of said sample.

7. The scanning probe microscope of claim 5, wherein said second mechanism is a second actuator having a first and second end, said second actuator coupled to said microscope body at said first end of said second actuator and coupled to said second probe at said second end of said second actuator.

8. The scanning probe microscope of claim 7, wherein said second probe comprises a second contact type probe, said second contact type probe comprising a second tip.

9. The scanning probe microscope of claim 8, wherein said second tip is sharper than said first tip.

10. The scanning probe microscope of claim 1, further comprising a microscope body, wherein said second mechanism is an actuator having a first and second end, said actuator coupled to said microscope body at said first end and coupled to said second probe at said second end.

11. The scanning probe microscope of claim 10, wherein said second probe comprises a contact type probe, said second contact type probe comprising a tip, said effective measurement distance being zero in that said second contact type probe cannot measure characteristics of said surface of said sample without actually contacting said surface of said sample.

12. An scanning probe microscope comprising:
    a microscope body;
    a first probe configured to interact with and measure characteristics of surfaces within an effective measurement distance of said first probe, wherein said first probe is a contact type probe which is configured to interact with and measure said characteristics of said surfaces by contacting said surface;
    a first mechanism configured to position said first probe over a first point of a surface of a sample within said effective measurement distance, wherein said first mechanism is a first actuator having a first and second end, said first actuator coupled to said microscope body at said first end of said first actuator and coupled to said first probe at said second end of said first actuator;
    a second probe, wherein said second probe comprises a second contact type probe, said second contact type probe comprising a second tip, said effective measurement distance being zero in that said second contact type probe cannot measure characteristics of said surface of said sample without actually contacting said surface of said sample;
    a second mechanism configured to contact and remove said second probe to and from said surface of said sample at a second point, wherein said second point is separated from said first point by a predetermined distance in a predetermined direction, wherein said second mechanism is a second actuator having a first and second end, said second actuator coupled to said microscope body at said first end of said second actuator and coupled to said second probe at said second end of said second actuator, wherein said second tip is sharper than said first tip; and
    a third mechanism configured to move said second probe said predetermined distance in said predetermined direction, said third mechanism comprising:
       a scanner configured to receive, interpret, and respond to data representing movement instructions to move said scanner said predetermined distance in said first direction, said scanner comprising piezoelectric tubes; and
       a controller configured to send said data to said scanner.

13. A method for probing a surface of a sample comprising:
    contacting a first probe comprising a first contact end to a surface of said sample at said first contact end;
    after contacting a first probe, moving said first probe along said surface until said first contact end contacts a target point on said surface; and
    after moving said first probe, contacting a second probe comprising a second contact end to said target point at said second contact end, said second probe being a fixed distance from said first probe in a first direction.

14. The method of claim 13, wherein said step of contacting a second probe further comprises the substep of moving said second probe said fixed distance in said first direction.

15. The method of claim 14, wherein said substep of moving said second probe comprises the substep of moving said second probe said fixed distance before contacting said second probe to said target point at said second contact end.

16. The method of claim 13 further comprising the step of, after contacting a second probe, moving said second probe along said surface.

17. The method of claim 13 wherein said step of contacting a second probe comprises the step of contacting said second probe comprising said second contact end smaller than said first contact end to said surface of said sample at said second contact end, said second probe being said fixed distance from said first probe in said first direction.

18. The method of claim 13 wherein said step of contacting a second probe comprises the step of contacting said second probe comprising said second contact end smaller than said first contact end by a factor of ten to a surface of said sample at said second contact end, said second probe being said fixed distance from said first probe in said first direction.

19. A scanning probe microscope comprising:
- a first cantilever coupled to a first actuator, said first actuator being for driving said first cantilever between a raised position and a lowered position, a tip of said first cantilever being closest to a surface of a sample when said first cantilever is in said lowered position;
- a second cantilever coupled to a second actuator, said second actuator being for driving said second cantilever between a raised position and a lowered position, a tip of said second cantilever being closest to said surface of said sample when said second cantilever is in said lowered position; and
- a control unit for controlling said first and second actuators such that said first cantilever is in said lowered position when said second cantilever is in said raised position.

20. A method of analyzing a sample comprising the steps of:
- providing a scanning probe microscope, said scanning probe microscope having first and second cantilevers with first and second tips, respectively, separated by a fixed predetermined distance;
- positioning said cantilevers such that said first tip is within an effective measurement distance of said sample and said second tip is spaced apart from said sample;
- causing relative motion between said cantilevers and said sample such that said first tip arrives over a first location on said sample;
- positioning said cantilevers such that said first tip is spaced apart from said sample and said second tip is adjacent said sample;
- scanning said sample with said second tip so as to generate a representation of a property of said sample.

* * * * *